(12) United States Patent
Tarkin-Tas et al.

(10) Patent No.: US 11,919,989 B2
(45) Date of Patent: *Mar. 5, 2024

(54) CURABLE COMPOSITION AND CURED COMPOSITION PREPARED THEREFROM

(71) Applicant: SHPP Global Technologies B.V., Bergen op Zoom (NL)

(72) Inventors: Eylem Tarkin-Tas, Selkirk, NY (US); Brian Jason Rice, Huntersville, NC (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 561 days.

This patent is subject to a terminal disclaimer.

(21) Appl. No.: 17/165,228

(22) Filed: Feb. 2, 2021

(65) Prior Publication Data

US 2021/0269574 A1 Sep. 2, 2021

(30) Foreign Application Priority Data

Feb. 28, 2020 (EP) ..................................... 20160048

(51) Int. Cl.
| | | |
|---|---|---|
| C08F 2/46 | (2006.01) | |
| C08F 2/50 | (2006.01) | |
| C08F 283/08 | (2006.01) | |
| C08G 61/04 | (2006.01) | |

(52) U.S. Cl.
CPC ................................. *C08F 283/08* (2013.01)

(58) Field of Classification Search
CPC ........... C08K 5/04; C08K 5/09; C08F 283/08; C08G 65/485; C08G 77/46; C08L 83/06; C08L 83/12; C08L 71/126; C08L 33/06
USPC ........... 522/43, 33, 6, 71, 1, 189, 184; 520/1
See application file for complete search history.

(56) References Cited

U.S. PATENT DOCUMENTS

| | | | |
|---|---|---|---|
| 6,440,642 B1 | 8/2002 | Shelnut et al. | |
| 2001/0053820 A1 | 12/2001 | Yeager et al. | |
| 2008/0071034 A1* | 3/2008 | Braidwood | C08F 283/085 |
| | | | 525/392 |
| 2012/0065336 A1 | 3/2012 | Mizori et al. | |
| 2016/0369040 A1 | 12/2016 | Das et al. | |
| 2022/0204677 A1* | 6/2022 | Rice | C08F 290/068 |

FOREIGN PATENT DOCUMENTS

| | | |
|---|---|---|
| CN | 103980479 A | 8/2014 |
| CN | 105524449 A | 4/2016 |
| CN | 105926363 A | 9/2016 |
| JP | 1997157316 * | 6/1997 |
| WO | 2010039430 A2 | 4/2010 |

OTHER PUBLICATIONS

Toru et al., JP 1997-157316 Machine Translation, Jun. 17, 1997 (Year: 1997).*
Bagheri, A. et al., "Photopolymerization in 3D Printing", ACS Applied Polymer Materials, vol. 1, 2019; pp. 593-611.

* cited by examiner

*Primary Examiner* — Jessica Whiteley
(74) *Attorney, Agent, or Firm* — CANTOR COLBURN LLP

(57) ABSTRACT

A curable composition includes a functionalized phenylene ether oligomer, a reactive diluent, and a photoinitiator. The curable composition can be cured to provide a cured composition. Articles comprising the cured composition and methods for the manufacture of the cured composition are also described. The curable composition can be particularly useful for providing three-dimensional, additively-manufactured articles.

20 Claims, No Drawings

CURABLE COMPOSITION AND CURED COMPOSITION PREPARED THEREFROM

CROSS-REFERENCE TO RELATED APPLICATION

This application claims priority to and the benefit of European Application No. 20160048.3 filed on Feb. 28, 2020, which is incorporated by reference herein in its entirety.

BACKGROUND

Phenylene ether oligomers have demonstrated utility in thermoset compositions, for example in electronics applications. The thermoset compositions benefit from the oligomers' high glass transition temperature, high toughness, low dielectric properties, and low water absorption. For example, some advantages have been observed for bifunctional oligomers comprising, on average, about two hydroxyl groups per molecule. Such bifunctional oligomers can be prepared by copolymerizing a monohydric phenol, such as 2,6-dimethylphenol, with a dihydric phenol, such as 2,2-bis(4-hydroxy-3,5-dimethyl)propane. See, e.g., U.S. Pat. No. 7,655,278 B2 to Braidwood et al.

There remains a need for a curable composition which can be cured by ultraviolet (UV) radiation or by UV/thermal dual curing systems. Such compositions would be particularly useful for the manufacture of three dimensional articles by additive manufacturing techniques.

SUMMARY

A curable composition comprises a functionalized phenylene ether oligomer, preferably wherein the functionalized phenylene ether oligomer comprises at least one end group that is a (meth)acrylate group, a vinyl benzene group, an allyl group, or a maleimide group; a reactive diluent; and a photoinitiator.

A cured composition comprises a cured product of the curable composition.

A method for the manufacture of a cured composition comprises curing the curable composition using ultraviolet light.

An article comprises the cured composition.

A three-dimensional, additively-manufactured article comprises a cured product of a curable composition comprising a functionalized phenylene ether oligomer; a reactive diluent; and a photoinitiator.

The above described and other features are exemplified by the following detailed description.

DETAILED DESCRIPTION

The present inventors have discovered a curable composition including a functionalized phenylene ether oligomer and a reactive diluent. Advantageously, it was found that the functionalized phenylene ether oligomer can be solubilized by the reactive diluent, and the resulting solutions are maintained as homogenous even upon cooling. The compositions can be cured by UV light or dual-cured using a combination of UV light and heat. The compositions of the present disclosure are particularly well-suited for additive manufacturing by UV or UV/thermal dual curing mechanisms. The resulting cured compositions can exhibit advantageous properties such as high glass transition temperature.

Accordingly, an aspect of the present disclosure is a curable composition. The curable composition comprises a functionalized phenylene ether oligomer (also referred to herein as a "phenylene ether oligomer" for simplicity). The functionalized phenylene ether oligomer preferably comprises at least one end group that is a (meth)acrylate group, a vinyl benzene group, an allyl group, or a maleimide group. The functionalized phenylene ether oligomer can preferably be a bifunctional oligomer having functional groups at both termini of the oligomer chain. Bifunctional polymers with functional groups at both termini of the polymer chains are also referred to as "telechelic" polymers. The phenylene ether oligomer of the present disclosure can have the structure

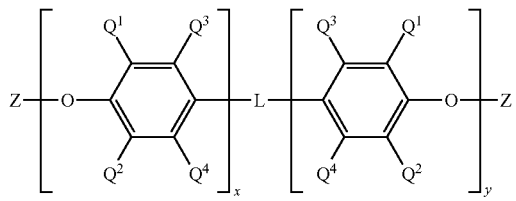

wherein $Q^1$ and $Q^2$ each independently comprise halogen, unsubstituted or substituted $C_{1-12}$ primary or secondary hydrocarbyl (including cyclic hydrocarbyl groups), $C_{1-12}$ hydrocarbylthio, $C_{1-12}$ hydrocarbyloxy, and $C_{2-12}$ halohydrocarbyloxy wherein at least two carbon atoms separate the halogen and oxygen atoms; each occurrence of $Q^3$ and $Q^4$ independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms. In an aspect, $Q^1$ and $Q^2$ can each independently comprise unsubstituted or substituted $C_{1-12}$ primary or secondary hydrocarbyl. In an aspect, $Q^1$ and $Q^2$ each independently comprise a methyl group. In an aspect, at least one of $Q^1$ and $Q^2$ can comprise a cyclohexyl group. In an aspect, at least one of $Q^1$ and $Q^2$ can comprise a phenyl group. In an aspect, $Q^3$ and $Q^4$ each independently comprise hydrogen. Z is independently at each occurrence a (meth)acrylate group, a vinyl benzene group, an allyl group, or a maleimide group, preferably a (meth)acrylate group. In an aspect, Z is a (meth)acrylate group, preferably a methacrylate group. In an aspect, x and y are independently 0 to 30, specifically 0 to 20, more specifically 0 to 15, still more specifically 0 to 10, even more specifically 0 to 8, provided that the sum of x and y is at least 2, specifically at least 3, more specifically at least 4. Thus, in an aspect, the functionalized phenylene ether oligomer can comprise, for example, 2 to 60 repeating units. L has the structure

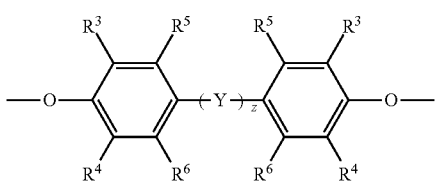

wherein each occurrence of $R^3$ and $R^4$ and $R^5$ and $R^6$ independently comprises hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms; z is 0 or 1; and Y has a structure comprising

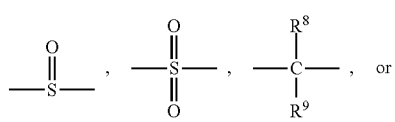, or

-continued

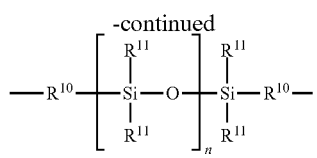

wherein $R^7$ is independently at each occurrence hydrogen and $C_{1-12}$ hydrocarbyl; $R^8$ and $R^9$ are independently at each occurrence hydrogen, $C_{1-12}$ hydrocarbyl, and $C_{1-6}$ hydrocarbylene wherein $R^8$ and $R^9$ collectively form a $C_{4-12}$ alkylene group; $R^{10}$ is independently at each occurrence a $C_{1-6}$ hydrocarbylene group; $R^{11}$ is independently at each occurrence a hydrogen, $C_{1-12}$ hydrocarbyl or $C_{1-12}$ halohydrocarbyl; and n is 5 to 50.

In an aspect, L can be derived from bisphenol A and can have the structure

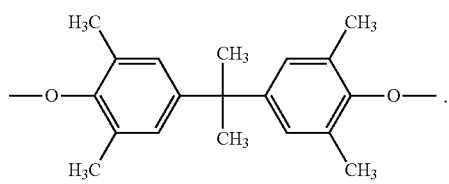

In an aspect, L can be of the formula

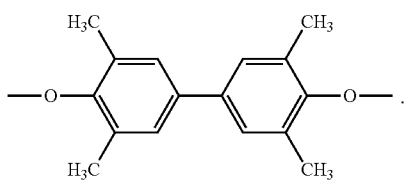

In an aspect, L can be of the formula

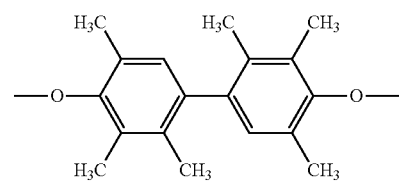

In an aspect, L can be of the formula

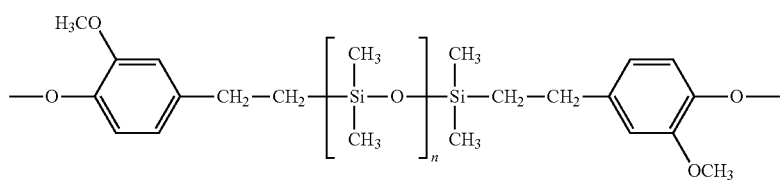

wherein n is 5 to 45.

In a specific aspect, $Q^1$ and $Q^2$ can each independently comprise unsubstituted or substituted $C_{1-12}$ primary or secondary hydrocarbyl; $Q^3$ and $Q^4$ can each independently comprise hydrogen; Z can be a (meth)acrylate group; and L can be of the structure

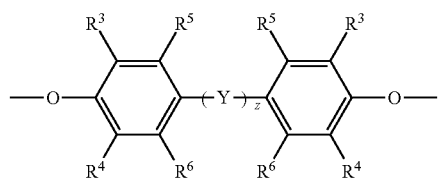

wherein $R^3$, $R^4$, $R^5$, and $R^6$ each independently comprise hydrogen or unsubstituted or substituted $C_{1-12}$ primary or secondary hydrocarbyl; and z is 1. In another specific aspect, $Q^1$ and $Q^2$ can each independently comprise a methyl group; $Q^3$ and $Q^4$ can each independently comprise hydrogen; Z can be a methacrylate group; and L can be of the structure

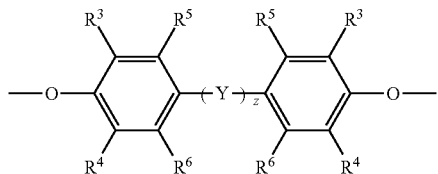

wherein $R^3$, $R^4$, $R^5$, and $R^6$ each independently comprise hydrogen or unsubstituted or substituted $C_{1-12}$ primary or secondary hydrocarbyl; and z is 1. In another specific aspect, $Q^1$ and $Q^2$ can each independently comprise a methyl group; $Q^3$ and $Q^4$ can each independently comprise hydrogen; Z can be a methacrylate group; and L can be of the structure

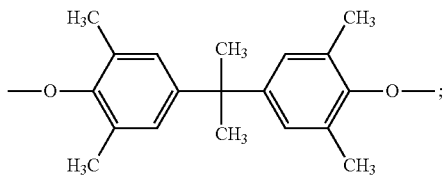

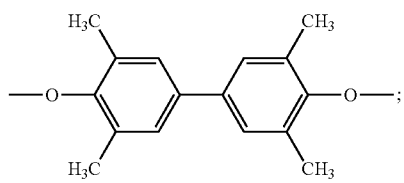

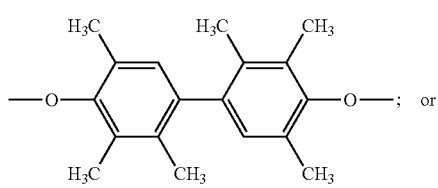; or

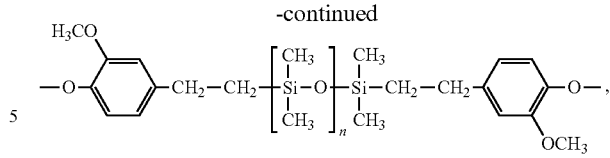

wherein n is 5 to 45.

In an aspect, the phenylene ether oligomer comprises a bifunctional phenylene ether oligomer having the structure

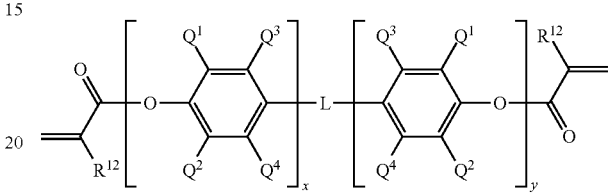

wherein $Q^1$, $Q^2$, $Q^3$, $Q^4$, L, x and y are as defined above $R^{12}$ is methyl or hydrogen.

In the (meth)acrylate-terminated phenylene ether structure above, there are limitations on the variables x and y, which correspond to the number of phenylene ether repeating units at two different places in the bifunctional phenylene ether oligomer. In the structure, x and y are independently 0 to 30, specifically 0 to 20, more specifically 0 to 15, even more specifically 0 to 10, yet more specifically 0 to 8. The sum of x and y is at least 2, specifically at least 3, more specifically at least 4. A phenylene ether oligomer can be analyzed by proton nuclear magnetic resonance spectroscopy ($^1$H NMR) to determine whether these limitations are met, on average. Specifically, $^1$H NMR spectroscopy can distinguish between protons associated with internal and terminal phenylene ether groups, with internal and terminal residues of a polyhydric phenol, and with terminal residues as well. It is therefore possible to determine the average number of phenylene ether repeating units per molecule, and the relative abundance of internal and terminal residues derived from dihydric phenol.

In an aspect, the phenylene ether oligomer comprises a bifunctional phenylene ether oligomer having the structure

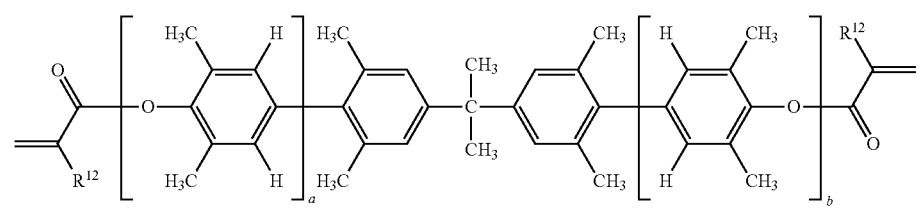

wherein each occurrence of a and b is independently 0 to 20, with the proviso that the sum of a and b is at least 2. $R^{12}$ is hydrogen or methyl, preferably methyl.

In an aspect, the phenylene ether oligomer comprises a bifunctional phenylene ether oligomer having the structure

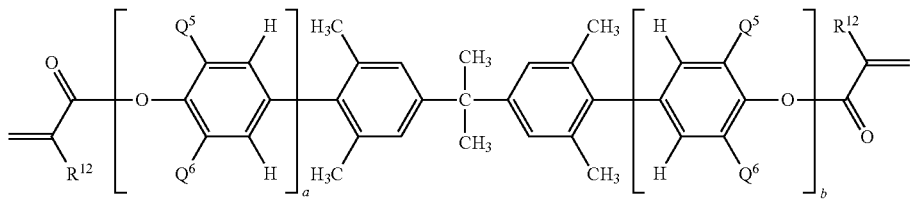

wherein each occurrence of $Q^5$ and $Q^6$ independently comprises methyl, di-n-butylaminomethyl, or morpholinomethyl; and each occurrence of a and b is independently 0 to 20, with the proviso that the sum of a and b is at least 2; and each occurrence of $R^{12}$ is methyl or hydrogen. An exemplary bifunctional phenylene ether oligomer includes NORYL™ Resin SA9000, available from SABIC.

In an aspect, the phenylene ether oligomer can have an intrinsic viscosity of 0.03 to 0.13 deciliter per gram, or 0.05 to 0.1 deciliter per gram, or 0.1 to 0.15 deciliter per gram, measured at 25° C. in chloroform using an Ubbelohde viscometer. The phenylene ether oligomer can have a number average molecular weight of 500 to 7,000 grams per mole, and a weight average molecular weight of 500 to 15,000 grams per mole, as determined by gel permeation chromatography using polystyrene standards. In an aspect, the number average molecular weight can be 750 to 4,000 grams per mole, and the weight average molecular weight can be 1,500 to 9,000 grams per mole, as determined by gel permeation chromatography using polystyrene standards.

The phenylene ether oligomer can be present in the curable composition in an amount of 1 to 50 weight percent, based on the total weight of the phenylene ether oligomer and the reactive diluent and, when present, a photocurable resin (as discussed below). Within this range, the phenylene ether oligomer can be present in an amount of 10 to 40 weight percent, or 10 to 30 weight percent, or 20 to 40 weight percent, or 5 to 30 weight percent, or 5 to 15 weight percent.

In addition to the functionalized phenylene ether oligomer, the curable composition further comprises a reactive diluent. A reactive diluent can be any compound that is miscible with all components of the curable composition and does not adversely affect the function of the curable composition or the cured composition resulting therefrom. The reactive diluent can be used to adjust the viscosity of the composition, rendering the curable composition of the present disclosure useful for a variety of applications. Reactive diluents function to solubilize the components of the composition of the present disclosure, and also to cure to form a part of the final cured composition or article. Thus the use of the reactive diluent avoids the use of volatile organic solvents. Accordingly, in an aspect volatile organic solvents can be minimized or excluded from the present composition (e.g., present in an amount of less than or equal to 1 weight percent, or less than or equal to 0.1 weight percent, or wherein the composition is devoid of an organic solvent). Reactive diluents useful in the present disclosure can also function as crosslinking agents.

Suitable reactive diluents for use in the present disclosure can include, but are not limited to, a (meth)acrylate monomer, a di(meth)acrylate, a vinyl monomer, or a combination thereof. (Meth)acrylate-containing monomers can include $C_{1-24}$ alkyl (meth)acrylate monomers. A particular (meth)acrylate-containing reactive diluent can include isobornyl acrylate, isobornyl methacrylate, and the like, or a combination thereof. In an aspect, the reactive diluent can comprise a (meth)acrylate-functionalized glycol, for example dipropylene glycol diacrylate, hexanediol diacrylate, tripropylene glycol diacrylate, 4-t-butylcyclohexyl acrylate, and the like or a combination thereof. In an aspect, the reactive diluent comprises dipropylene glycol diacrylate, hexanediol diacrylate, tripropylene glycol diacrylate, isobornyl acrylate, isobornyl methacrylate, 4-t-butylcyclohexyl acrylate, or a combination thereof.

The reactive diluent can be present in an amount of 50 to 99 weight percent, based on the total weight of the phenylene ether oligomer and the reactive diluent. Within this range, the reactive diluent can be present in an amount of 60 to 90 weight percent or 60 to 80 weight percent. When a photocurable resin is present in the composition, as discussed below, the reactive diluent can be present in an amount of 17 to 37 weight percent, or 22 to 32 weight percent, each based on the total weight of the phenylene ether oligomer, the reactive diluent and the photocurable resin.

In an aspect, the curable composition can optionally further comprise one or more photocurable resins. As used herein, the term "photocurable resin" refers to an oligomeric or polymeric structure containing at least one reactive group that can be photocured. For example, suitable photocurable resins can include, but are not limited to, a (meth)acrylate-containing oligomer or polymer, preferably a (meth)acrylate-containing oligomer. For example, suitable (meth)acrylate-containing oligomers can include, but are not limited to, (meth)acrylate-containing oligomeric urethanes and (meth)acrylate-containing oligomeric epoxies, and the like, or a combination thereof. When present, the photocurable resin is preferably soluble in the reactive diluent. In an aspect, the photocurable resin can comprise an acrylate functionalized aliphatic polyurethane. An exemplary reactive diluent which includes a photocurable resin is LAROMER US 9072 or LAROMER US 9048, both available from BASF.

When present, the photocurable resin can be included in the composition in an amount of 53 to 73 weight percent or 58 to 68 weight percent, each based on the total weight of the phenylene ether oligomer, the reactive diluent and the photocurable resin.

In addition to the phenylene ether oligomer and the reactive diluent and, optionally, the photocurable resin, the curable composition also comprises a photoinitiator. The photoinitiator can be activated by exposure to a particular wavelength of light, preferably ultraviolet (UV) light. Preferably, the photoinitiator is a radical photoinitiator (also referred to as a "free radical photoinitiator"). A radical photoinitiator is one that generates radicals upon absorbing a particular wavelength of light. The exposure can be accomplished using standard methods known in the art, for example using any source of UV light. The selection of the type of the photoinitiator is generally dependent on the wavelength of curing radiation used. It is generally preferred that the peak absorption wavelengths of the selected photoinitiator sufficiently overlap with the wavelength of curing radiation used. In an aspect, the radical photoinitiator can include, but is not limited to, benzoin ethers, benzil ketals, α-dialkoxy-acetophenones, α-hydroxyalkylphenones, α-aminoalkylphenones, and acylphosphine oxides. In an aspect, the photoinitiator can comprise an α-dialkoxy-acetophenones. Examples of suitable photoinitiators include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2-phenylacetophenone, 2-hydroxy-2-methylpropionphenone, diphenyl (2,4,6-trimethylbenzoyl) phosphine oxide, bis(2,6-dimethoxy-benzoyl)-2,4,6-trimethyl phenyl phosphine oxide, 2-methyl-1-1-[4-(methylthio) phenyl]-2-morpholinopropan-1-one, 3,6-bis(2-methyl-2-morpholino-propionyl)-9-n-octylcarbazole, 2-benzyl-2-(dimethylamino)-1-(4-morpholinyl)phenyl)-1-butanone, benzophenone, 2,4,6-trimethylbenzophenone, isopropyl thioxanthone. In an aspect, the photoinitiator can comprise 2,2-dimethoxy-2-phenylacetophenone. As used herein, the term "photoinitiator" or "radical photoinitiator" does not include photoacid generators or photobase generators, which are molecules that become more acidic or basic (respectively) upon absorption of light.

The photoinitiator can be present in an amount of 1 to 10 parts per hundred (phr), based on the total weight of the phenylene ether oligomer and the reactive diluent (and the photocurable resin, when present). Within this range, the photoinitiator can be present in an amount of 1 to 5 parts per hundred.

In a specific aspect, the curable composition comprises 1 to 50 weight percent, or 10 to 40 weight percent, or 20 to 40 weight percent of the phenylene ether oligomer; and 50 to 99 weight percent, or 60 to 90 weight percent, or 60 to 80 weight percent of the reactive diluent; wherein weight percent of the phenylene ether oligomer and the reactive diluent are each based on the total weight of the phenylene ether oligomer and the reactive diluent; and 1 to 10 parts per hundred, or 1 to 5 parts per hundred of the photoinitiator, based on the total weight of the phenylene ether oligomer and the reactive diluent.

In another specific aspect, the curable composition comprises 5 to 30 weight percent, or 5 to 15 weight percent of the phenylene ether oligomer; 17 to 37 weight percent, or 22 to 32 weight percent of the reactive diluent; and 53 to 73 weight percent, or 58 to 68 weight percent of the photocurable resin; wherein weight percent of the phenylene ether oligomer, the reactive diluent and the photocurable resin are each based on the total weight of the phenylene ether oligomer, the reactive diluent and the photocurable resin; and 1 to 10 parts per hundred, or 1 to 5 parts per hundred of the photoinitiator, based on the total weight of the phenylene ether oligomer, the reactive diluent and the photocurable resin.

The curable composition can optionally further comprise a thermal initiator. Preferably, the thermal initiator generates radicals upon heating to a decomposition temperature. Particular thermal initiators can be selected depending on the curing temperature to be used. Exemplary thermal initiators can include, for example, azo-containing compounds and peroxide-containing compounds. In particular, exemplary thermal initiators can include, but are not limited to, 2,2'-azobisisobutyronitrile (AIBN), benzoyl peroxide, tert-butyl hydroperoxide, cumene hydroperoxide, di-tert-butyl peroxide, dicumyl peroxide, and the like, or a combination thereof. For example, the composition can optionally comprise a peroxide initiator.

It will be understood that, when a thermal initiator is present, the curable composition can be subjected to a dual-cure mechanism to provide a desired cured composition. For example, the curable composition can be cured by exposure to light, and subsequently by thermal curing. Alternatively, the curable composition can be cured by thermal curing followed by photocuring. In another aspect, the curable composition can be cured by simultaneous exposure to light and heat. Preferably, curing the curable composition can be by exposure to light (i.e., photocuring), and subsequently by thermal curing.

When present, the thermal initiator can be included in the composition in an amount of 1 to 10 parts per hundred (phr), based on the total weight of the phenylene ether oligomer and the reactive diluent (and the photocurable resin, when present). Within this range, the thermal initiator can be present in an amount of 1 to 5 parts per hundred.

In an aspect, the curable composition can optionally further comprise an auxiliary curable resin. The auxiliary curable resin can be a thermoset resin, for example, an epoxy resin, a cyanate ester resin, a (bis)maleimide resin, a (poly) benzoxazine resin, a vinyl resin (e.g., a vinyl benzyl ether resin), a phenolic resin, an alkyd resin, an unsaturated polyester resin, an arylcyclobutene resin, a perfluorovinyl ether resin, oligomers or polymers with curable unsaturation (e.g., a vinyl functionality), or a combination thereof. Preferably, the auxiliary curable resin comprises an epoxy resin or an oligomer or polymer with curable unsaturation.

Epoxy resins useful as auxiliary curable resins can be produced by reaction of phenols or polyphenols with epichlorohydrin to form polyglycidyl ethers. Examples of useful phenols for production of epoxy resins include substituted bisphenol A, bisphenol F, hydroquinone, resorcinol, tris-(4-hydroxyphenyl)methane, and novolac resins derived from phenol or o-cresol. Epoxy resins can also be produced by reaction of aromatic amines, such as p-aminophenol or methylenedianiline, with epichlorohydrin to form polyglycidyl amines. Epoxy resins can be converted into solid, infusible, and insoluble three dimensional networks by curing with cross-linkers, often called curing agents, or hardeners. Curing agents are either catalytic or coreactive. Coreactive curing agents have active hydrogen atoms that can react with epoxy groups of the epoxy resin to form a cross-linked resin. The active hydrogen atoms can be present in functional groups comprising primary or secondary amines, phenols, thiols, carboxylic acids, or carboxylic acid anhydrides. Examples of coreactive curing agents for epoxy resins include aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, or a combination comprising at least one of the foregoing coreactive curing agents. A catalytic curing agent functions as an initiator for epoxy resin homopolymerization or as an accelerator for coreactive curing agents. Examples of catalytic curing agents include tertiary amines, such as 2-ethyl-4-methylimidazole, Lewis acids, such as boron trifluoride, and latent cationic cure catalysts, such as diaryliodonium salts.

The auxiliary curable resin can be a cyanate ester. Cyanate esters are compounds having a cyanate group (—O—C≡N) bonded to carbon via the oxygen atom, i.e. compounds with C—O—C≡N groups. Cyanate esters useful as thermoset resins can be produced by reaction of a cyanogen halide with a phenol or substituted phenol. Examples of useful phenols include bisphenols utilized in the production of epoxy resins, such as bisphenol A, bisphenol F, and novolac resins based on phenol or o-cresol. Cyanate ester prepolymers are prepared by polymerization/cyclotrimerization of cyanate esters. Prepolymers prepared from cyanate esters and diamines can also be used.

The auxiliary curable resin can be a bismaleimide. Bismaleimide resins can be produced by reaction of a monomeric bismaleimide with a nucleophile such as a diamine, aminophenol, or amino benzhydrazide, or by reaction of a bismaleimide with diallyl bisphenol A. Specific examples of bismaleimide resins can include 1,2-bismaleimidoethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimidodiphenylether, 3,3'-bismaleimidodiphenylsulfone, 4,4'-bismaleimidodiphenylsulfone, 4,4'-bismaleimidodicyclohexylmethane, 3,5-bis(4-maleimidophenyl)pyridine, 2,6-bismaleimidopyridine, 1,3-bis(maleimidomethyl)cyclohexane, 1,3-bis(maleimidomethyl)benzene, 1,1-bis(4-maleimidophenyl)cyclohexane, 1,3-bis(dichloromaleimido)benzene, 4,4'-bis(citraconimido)diphenylmethane, 2,2-bis(4-maleimidophenyl)propane, 1-phenyl-1,1-bis(4-maleimidophenyl)ethane, N,N-bis(4-maleimidophenyl)toluene, 3,5-bismaleimido-1,2,4-triazole N,N'-ethylenebismaleimide, N,N'-hexamethylenebismaleimide, N,N'-m-phenylenebismaleimide, N,N'-p-phenylenebismaleimide, N,N'-4,4'-diphenylmethanebismaleimide, N,N'-4,4'-diphenyletherbismaleimide, N,N'-4,4'-diphenylsufonebismaleimide, N,N'-4,4'-dicyclohexylmethanebismaleimide, N,N'-alpha,alpha'-4,4'-dimethylenecyclohexanebismaleimide, N,N'-m-methaxylenebismaleimide, N,N'-4,4'-diphenylcyclohexanebismaleimide, and N,N'-methylenebis(3-chloro-p-phenylene)bismaleimide, as well as the maleimide resins disclosed in U.S. Pat. No. 3,562,223 to Bargain et al., and U.S. Pat. Nos. 4,211,860 and 4,211,861 to Stenzenberger. Bismaleimide resins can be prepared by methods known in the art, as described, for example, in U.S. Pat. No. 3,018,290 to Sauters et al. In an aspect, the bismaleimide resin is N,N'-4,4'-diphenylmethane bismaleimide.

The auxiliary curable resin can be a benzoxazine resin. As is well known, benzoxazine monomers are made from the reaction of three reactants, aldehydes, phenols, and primary amines with or without solvent. U.S. Pat. No. 5,543,516 to Ishida describes a solventless method of forming benzoxazine monomers. An article by Ning and Ishida in *Journal of Polymer Science, Chemistry Edition*, vol. 32, page 1121 (1994) describes a procedure using a solvent. The procedure using solvent is generally common to the literature of benzoxazine monomers.

The preferred phenolic compounds for forming benzoxazines include phenols and polyphenols. The use of polyphenols with two or more hydroxyl groups reactive in forming benzoxazines may result in branched and/or crosslinked products. The groups connecting the phenolic groups into a phenol can be branch points or connecting groups in the polybenzoxazine.

Suitable phenols for use in the preparation of benzoxazine monomers include phenol, cresol, resorcinol, catechol, hydroquinone, 2-allylphenol, 3-allylphenol, 4-allylphenol, 2,6-dihydroxynaphthalene, 2,7-dihydrooxynapthalene, 2-(diphenylphosphoryl)hydroquinone, 2,2'-biphenol, 4,4-biphenol, 4,4'-isopropylidenediphenol (bisphenol A), 4,4'-isopropylidenebis(2-methylphenol), 4,4'-isopropylidenebis(2-allylphenol), 4,4'(1,3-phenylenediisopropylidene) bisphenol (bisphenol M), 4,4'-isopropylidenebis(3-phenylphenol) 4,4'-(1,4-phenylenediisoproylidene) bisphenol (bisphenol P), 4,4'-ethylidenediphenol (bisphenol E), 4,4'oxydiphenol, 4,4'thiodiphenol, 4,4'-sufonyldiphenol, 4,4'-sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), Bis(4-hydroxyphenyl)methane (Bisphenol-F), 4,4'-(cyclopentylidene)diphenol, 4,4'-(cyclohexylidene) diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, isopropylidenebis(2-allylphenol), 3,3-bis(4-hydroxyphenyl)isobenzofuran-1(3H)-one, 1-(4-hydroxyphenyl)-3,3-dimethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl) ethane, tris(4-hydroxyphenyl)propane, tris(4-hydroxyphenyl)butane, tris(3-methyl-4-hydroxyphenyl)methane, tetrakis(4-hydroxyphenyl)ethane dicyclopentadienylbis(2,6-dimethyl phenol), dicyclopentadienyl bis(ortho-cresol), dicyclopentadienyl bisphenol, and the like.

The aldehydes used to form the benzoxazine can be any aldehyde. In an aspect, the aldehyde has 1 to 10 carbon atoms. In some embodiments, the aldehyde is formaldehyde. The amine used to form the benzoxazine can be an aromatic amine, an aliphatic amine, an alkyl substituted aromatic, or an aromatic substituted alkyl amine. The amine can also be a polyamine, although the use of polyamines will, under some circumstances, yield polyfunctional benzoxazine monomers. Polyfunctional benzoxazine monomers are more likely to result in branched and/or crosslinked polybenzoxazines than monofunctional benzoxazines, which would be anticipated to yield thermoplastic polybenzoxazines.

The amines for forming benzoxazines generally have 1 to 40 carbon atoms unless they include aromatic rings, and then they may have 6 to 40 carbon atoms. The amine of di- or polyfunctional may also serve as a branch point to connect one polybenzoxazine to another. Thermal polymerization has been the preferred method for polymerizing benzoxazine monomers. The temperature to induce thermal polymerization is typically varied from 150 to 300° C. The polymerization is typically done in bulk, but could be done from solution or otherwise. Catalysts, such as carboxylic acids, have been known to slightly lower the polymerization temperature or accelerate the polymerization rate at the same temperature.

The auxiliary curable resin can be a vinyl benzyl ether resin. Vinyl benzyl ether resins can be most readily prepared from condensation of a phenol with a vinyl benzyl halide, such as vinyl benzyl chloride to produce a vinyl benzyl ether. Bisphenol-A and trisphenols and polyphenols are generally used to produce poly(vinylbenzyl ethers) which may be used to produce crosslinked thermosetting resins. Vinyl benzyl ethers useful in the present composition can include those vinylbenzyl ethers produced from reaction of vinylbenzyl chloride or vinylbenzyl bromide with resorcinol, catechol, hydroquinone, 2,6-dihydroxy naphthalene, 2,7-dihydroxynaphthalene, 2-(diphenylphosphoryl)hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol (bisphenol E), 4,4'-oxydiphenol, 4,4'-thiodiphenol, 4,4'-thiobis(2,6-dimethylphenol), 4,4'-sufonyldiphenol, 4,4'-sulfonylbis(2,6-dimethylphenol) 4,4'-sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(ortho-cresol), dicyclopentadienyl bisphenol, and the like.

The auxiliary curable resin can be an arylcyclobutene resin. Arylcyclobutenes include those derived from compounds of the general structure

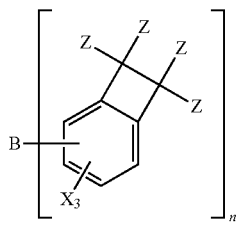

wherein B is an organic or inorganic radical of valence n (including carbonyl, sulfonyl, sulfinyl, sulfide, oxy, alkylphosphonyl, arylphosphonyl, isoalkylidene, cycloalkylidene, arylalkylidene, diarylmethylidene, methylidene dialkylsilanyl, arylalkylsilanyl, diarylsilanyl and $C_6$-$C_{20}$ phenolic compounds); each occurrence of X is independently hydroxy or $C_1$-$C_{24}$ hydrocarbyl (including linear and branched alkyl and cycloalkyl); and each occurrence of Z is independently hydrogen, halogen, or $C_1$-$C_{12}$ hydrocarbyl; and n is 1 to 1000, preferably 1 to 8, more preferably 2, 3, or 4. Other useful arylcyclobutenes and methods of arylcyclobutene synthesis can be found in U.S. Pat. Nos. 4,743, 399, 4,540,763, 4,642,329, 4,661,193, and 4,724,260 to Kirchhoff et al., and 5391,650 to Brennan et al.

The auxiliary curable resin can be a perfluorovinyl ether resin. Perfluorovinyl ethers are typically synthesized from phenols and bromotetrafluoroethane followed by zinc catalyzed reductive elimination producing ZnFBr and the desired perfluorovinylether. By this route bis, tris, and other polyphenols can produce bis-, tris- and poly(perfluorovinylether)s. Phenols useful in their synthesis include resorcinol, catechol, hydroquinone, 2,6-dihydroxy naphthalene, 2,7-dihydroxynapthalene, 2-(diphenylphosphoryl)hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol (bisphenol E), 4,4'oxydiphenol, 4,4'thiodiphenol, 4,4'thiobis(2,6-dimethylphenol), 4,4'-sufonyldiphenol, 4,4'-sulfonylbis(2,6-dimethylphenol) 4,4'-sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl)phenylphosphine oxide, dicyclopentadienylbis(2,6-dimethyl phenol), dicyclopentadienyl bis(2-methylphenol), dicyclopentadienyl bisphenol, and the like.

The auxiliary curable resin can be an oligomer or polymer with curable vinyl functionality. Such materials include oligomers and polymers having crosslinkable unsaturation. Examples include styrene butadiene rubber (SBR), butadiene rubber (BR), and nitrile butadiene rubber (NBR) having unsaturated bonding based on butadiene; natural rubber (NR), isoprene rubber (IR), chloroprene rubber (CR), butyl rubber (IIR), and halogenated butyl rubber having unsaturated bonding based on isoprene; ethylene-α-olefin copolymer elastomers having unsaturated bonding based on dicyclopentadiene (DCPD), ethylidene norbornene (ENB), or 1,4-dihexadiene (1,4-HD) (namely, ethylene-α-olefin copolymers obtained by copolymerizing ethylene, an α-olefin, and a diene, such as ethylene-propylene-diene terpolymer (EPDM) and ethylene-butene-diene terpolymer (EBDM). In an aspect, an EBDM is used. Examples also include hydrogenated nitrile rubber, fluorocarbon rubbers such as vinylidenefluoride-hexafluoropropene copolymer and vinylidenefluoride-pentafluoropropene copolymer, epichlorohydrin homopolymer (CO), copolymer rubber (ECO) prepared from epichlorohydrin and ethylene oxide, epichlorohydrin allyl glycidyl copolymer, propylene oxide allyl glycidyl ether copolymer, propylene oxide epichlorohydrin allyl glycidyl ether terpolymer, acrylic rubber (ACM), urethane rubber (U), silicone rubber (Q), chlorosulfonated polyethylene rubber (CSM), polysulfide rubber (T) and ethylene acrylic rubber. Further examples include various liquid rubbers, for example various types of liquid butadiene rubbers, and the liquid atactic butadiene rubber that is butadiene polymer with 1,2-vinyl connection prepared by anionic living polymerization. It is also possible to use liquid styrene butadiene rubber, liquid nitrile butadiene rubber (CTBN, VTBN, ATBN, etc. by Ube Industries, Ltd.), liquid chloroprene rubber, liquid polyisoprene, dicyclopentadiene type hydrocarbon polymer, and polynorbornene (for example, as sold by Elf Atochem).

Polybutadiene resins, generally polybutadienes containing high levels of 1,2 addition are desirable for thermosetting matrices. Examples include the functionalized polybutadienes and poly(butadiene-styrene) random copolymers sold by Ricon Resins, Inc. under the trade names RICON, RICACRYL, and RICOBOND resins. These include butadienes containing both low vinyl content such as RICON 130, 131, 134, 142; polybutadienes containing high vinyl content such as RICON 150, 152, 153, 154, 156, 157, and P30D; random copolymers of styrene and butadiene including RICON 100, 181, 184, and maleic anhydride grafted polybutadienes and the alcohol condensates derived therefrom such as RICON 130MA8, RICON MA13, RICON 130MA20, RICON 131MAS, RICON 131MA10, RICON MA17, RICON MA20, RICON 184MA6 and RICON 156MA17. Also included are polybutadienes that can be used to improve adhesion including RICOBOND 1031, RICOBOND 1731, RICOBOND 2031, RICACRYL 3500, RICOBOND 1756, RICACRYL 3500; the polybutadienes RICON 104 (25% polybutadiene in heptane), RICON 257 (35% polybutadiene in styrene), and RICON 257 (35% polybutadiene in styrene); (meth)acrylic functionalized polybutadienes such as polybutadiene diacrylates and polybutadiene dimethacrylates. These materials are sold under the tradenames RICACRYL 3100, RICACRYL 3500, and RICACRYL 3801. Also are included are powder dispersions of functional polybutadiene derivatives including, for example, RICON 150D, 152D, 153D, 154D, P30D, RICOBOND 0 1731 HS, and RICOBOND 1756HS. Further butadiene resins include poly(butadiene-isoprene) block and random copolymers, such as those with molecular weights from 3,000-50,000 grams per mole and polybutadiene homopolymers having molecular weights from 3,000-50,000 grams per mole. Also included are polybutadiene, polyisoprene, and polybutadiene-isoprene copolymers functionalized with maleic anhydride functions, 2-hydroxyethylmaleic functions, or hydroxylated functionality.

Further examples of oligomers and polymers with curable vinyl functionality include unsaturated polyester resins based on maleic anhydride, fumaric acid, itaconic acid and citraconic acid; unsaturated epoxy (meth)acrylate resins containing acryloyl groups, or methacryloyl group; unsaturated epoxy resins containing vinyl or allyl groups, urethane (meth)acrylate resin, polyether (meth)acrylate resin, polyalcohol (meth)acrylate resins, alkyd acrylate resin, polyester acrylate resin, spiroacetal acrylate resin, diallyl phthalate resin, diallyl tetrabromophthalate resin, diethyleneglycol bisallylcarbonate resin, and polyethylene polythiol resins.

Crosslinking agents may be added, such as compounds containing alkene or alkyne functionality. These include, for example, such maleimides as N,N'-m-phenylene bismaleimide, triallylisocyanurate, trimethallylisocyanurate, trimethallylcyanurate, and triallylcyanurate.

Combinations of any one or more of the foregoing auxiliary curable resins can be used as the auxiliary resin when present in the curable composition.

The curable composition can optionally further comprise a curing promoter. A suitable curing promoter can be selected based on the functional group present on the phenylene ether oligomer and, when present, the auxiliary curable resin or thermally curable resin containing ethylenically unsaturated groups. For example, the curing promoter can comprise an amine, a dicyandiamide, a polyamide, an amidoamine, a Mannich base, an anhydride, a phenol-formaldehyde resin, a carboxylic acid functional polyester, a polysulfide, a polymercaptan, an isocyanate, a cyanate ester, or a combination thereof. In an aspect, the curing promoter comprises aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, or a combination thereof. Preferably, the curing promoter can comprise a tertiary amine, a Lewis acid, or a combination thereof.

The curable composition can comprise 25 to 49 weight percent of the auxiliary curable resin. When an auxiliary curable resin is included in the composition, the reactive diluent component amount can be adjusted accordingly to account for the auxiliary curable resin. For example, in an aspect, the composition can comprise 1 to 50 weight percent of the phenylene ether oligomer, 25 to 49 weight percent of the reactive diluent; and 25 to 49 weight percent of the auxiliary curable resin, each based on the total weight of the phenylene ether oligomer, the reactive diluent, and the auxiliary curable resin.

The curable composition can optionally further comprise an inorganic filler. Suitable inorganic fillers include, for example, alumina, silica (including fused silica and crystalline silica), boron nitride (including spherical boron nitride), aluminum nitride, silicon nitride, magnesia, magnesium silicate, glass fibers, glass mat, or a combination thereof. Suitable glass fibers include those based on E, A, C, ECR, R, S, D, and NE glasses, as well as quartz. The glass fiber can have a diameter of 2 to 30 micrometers, preferably 5 to 25 micrometers, more preferably 5 to 15 micrometers. The length of the glass fibers before compounding can be 2 to 7 millimeters, preferably 1.5 to 5 millimeters. Alternatively, longer glass fibers or continuous glass fibers can be used. The glass fiber can, optionally, include an adhesion promoter to improve its compatibility with the phenylene ether oligomer, the reactive diluent, the photocurable resin, the auxiliary resin, or a combination of the foregoing. Adhesion promoters include chromium complexes, silanes, titanates, zircon-aluminates, propylene maleic anhydride copolymers, reactive cellulose esters, and the like. Suitable glass fiber is commercially available from suppliers including, for example, Owens Corning, Nippon Electric Glass, PPG, and Johns Manville.

When an inorganic filler is utilized, the curable composition can comprise 2 to 900 parts by weight of inorganic filler, based on 100 parts by weight total of the phenylene ether oligomer, reactive diluent, and, when present, the photocurable resin, the curing promoter, and any auxiliary resin. In an aspect, the curable composition comprises 100 to 900 parts by weight inorganic filler, preferably 200 to 800 parts by weight inorganic filler, and more preferably 300 to 700 parts by weight inorganic filler, based on 100 parts by weight total phenylene ether oligomer, reactive diluent, and, when present, the photocurable resin, the curing promoter and any auxiliary resin. In an aspect, the curable composition comprises less than 50 parts by weight inorganic filler, or less than 30 parts by weight inorganic filler, or less than 10 parts by weight inorganic filler. In an aspect, the curable composition can be substantially free of inorganic filler (that is, the composition can comprises less than 0.1 weight percent of added inorganic filler).

The curable composition can, optionally, further comprise one or more additives. Suitable additives include, for example, solvents, dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, or a combination thereof. Additives can be included in amounts generally known to be effective.

A cured composition is obtained by exposing the curable composition to light at a wavelength effective to activate the photoinitiator and for a time suitable to effect curing. Optionally, the cured composition can further be obtained by heating the curable composition for a time and at a temperature effective to effect curing of any thermally curable components present in the composition. For example, the curable composition can be heated to a temperature of 50 to 250° C. to cure the composition and provide the cured composition. The cured composition can also be referred to as a thermoset composition. In curing, a cross-linked, three-dimensional polymer network is formed. In an aspect, curing the composition can include injecting the curable composition into a mold, and curing the injected composition in the mold.

The curable composition can further be particularly useful in an additive manufacturing process to form an article comprising the cured composition. Thus another aspect of the present disclosure comprises additively manufacturing a 3-dimensional article from the curable composition of the present disclosure. For example, an additive manufacturing method according to the present disclosure can comprise depositing a layer of the curable composition on a carrier surface and irradiating the layer with light at a wavelength effective to activate the photoinitiator and effect at least partial curing of the layer to form a first cured layer comprising the cured composition. The method further comprises depositing a second layer of the curable composition on the first cured layer, and irradiating the second layer with light at a wavelength effective to activate the photoinitiator and effect at least partial curing of the second layer to form a second cured layer comprising the cured composition. The process can be repeated as needed until a desired article thickness is obtained.

In an advantageous aspect, the cured composition can have any of several beneficial physical properties that are useful in various articles, including good impact strength, hydrolytic stability, low moisture absorption, high glass transition temperature ($T_g$), superior flame retardancy, and good dielectric properties. For example, the cured composition can have a glass transition temperature of greater than or equal to 120° C., or greater than or equal to 150° C. Glass transition temperature can be determined, for example, using differential scanning calorimetry (DSC).

Given the advantageous properties associated with the cured compositions of the present disclosure, the compositions disclosed herein can be particularly useful in various electronics applications. Thus, articles comprising the cured composition represent another aspect of the present disclosure. The article can be a 3-dimensional article, preferably one that has been additively manufactured. In an aspect the article can be a consumer electronic component. In an aspect, a three-dimensional, additively-manufactured article comprises a cured product of a curable composition, wherein the curable composition comprises a functionalized phenylene ether oligomer, optionally in an amount of 1 to 50 weight percent, or 10 to 40 weight percent, or 20 to 40 weight percent; a reactive diluent, optionally in an amount of 50 to 99 weight percent, or 60 to 90 weight percent, or 60 to 80 weight percent; and a radical photoinitiator, optionally in an amount of 1 to 10 parts per hundred, or 1 to 5 parts per hundred; wherein weight percent of each of the functionalized phenylene ether oligomer and the reactive diluent is based on the total weight of the phenylene ether oligomer and the reactive diluent; and parts per hundred of the photoinitiator is based on the total weight of the phenylene ether oligomer and the reactive diluent. The curable composition can optionally further comprise one or more of a photocurable resin, a thermal initiator, and an auxiliary resin. Each of the aforementioned components can be as described above in reference to the curable composition of the present disclosure.

This disclosure is further illustrated by the following examples, which are non-limiting.

EXAMPLES

Materials used for the following examples are described in Table 1.

TABLE 1

| Component | Description | Supplier |
|---|---|---|
| PPE | A phenylene ether oligomer comprising repeating units derived from 2,6-dimethylphenol and 4,4'-isopropylidenebis(2,6-dimethylphenol), having an intrinsic viscosity of 0.09 deciliter per gram, a number average molecular weight of 2,300 grams/mole, and an average vinyl functionality of 1.9, obtained as NORYL SA9000 | SABIC |
| DPGDA | Dipropylene glycol diacrylate, CAS Registry No. 57472-68-1, obtained as LAROMER DPGDA | BASF |
| HDDA | Hexanediol diacrylate, CAS Registry No. 13048-33-4, obtained as LAROMER HDDA | BASF |
| TPGDA | Tripropylene glycol diacrylate, CAS Registry No. 42978-66-5, obtained as LAROMER TPGDA | BASF |
| PUA-1 | Aliphatic urethane acrylate (70%) in 4-t-butylcyclohexyl acrylate, CAS Registry No. 84100-23-2, obtained as LAROMER UA 9072 | BASF |
| PUA-2 | Aliphatic urethane acrylate (75%) in dipropylene glycol diacrylate, CAS Registry No. 4986-89-4, obtained as LAROMER UA9048 | BASF |

TABLE 1-continued

| Component | Description | Supplier |
|---|---|---|
| IBA | Isobornyl acrylate, CAS Registry No. 5888-33-5 | Sigma Aldrich |
| IBMA | Isobornyl methacrylate, CAS Registry No. 7534-94-3 | Sigma Aldrich |
| DMPA | 2,2-Dimethoxy-2-phenylacetophenone, CAS Registry No. 24650-42-8 | Sigma Aldrich |
| BPO | Benzoyl peroxide, CAS Registry No. 94-36-0 | Sigma Aldrich |

The PPE oligomer was first tested for solubility in various reactive diluents, optionally containing a photocurable resin (i.e., PUA-1 and PUA-2, which are oligomeric acrylates dissolved in a reactive diluent). Oligomeric acrylates can be dissolved in reactive diluents to manage the viscosity of the composition. PPE was dissolved in the various acrylates at 80° C. Upon cooling to room temperature, the compositions remained as homogenous solutions, with no visible phase separation occurring. The viscosity was also tested at various temperatures. The results are summarized in Table 2. Viscosity (reported in centipoise, cP) was determined using a Brookfield viscometer (DV-II+Pro) and Thermosel with disposable aluminum tubes and spindles was used to measure the viscosity of the compositions.

TABLE 2

| Acrylate | PPE (weight percent) | Temperature (° C.) | Viscosity (cP, at 80° C.) | Viscosity (cP, at 50° C.) | Viscosity (cP, at 25° C.) |
|---|---|---|---|---|---|
| DPGDA | 30 | 80 | 72.5 | 232.5 | 1533 |
| HDDA | 30 | 80 | 55 | 100 | 427.5 |
| TPGDA | 30 | 80 | 115 | 310 | 2250 |
| PUA-1 | 10 | 80 | 8025 | 49200 | 437000 |
| IBA | 10 | 80 | 95 | 400 | 2355 |
| IBMA | 10 | 80 | 100 | 400 | 2430 |

Curable compositions were formulated as shown in Table 3. The compositions shown in Table 3 were cast into films between glass slides, and cured under UV light for 10 minutes. A UVP Blak-Ray B-100A UV lamp operating at 100 watts at 365 nm wavelength was used. The cured films were placed in chloroform, wherein they were determined to be insoluble due to network formation. The films were further analyzed by differential scanning calorimetry (DSC), which showed an increase in glass transition temperature (Tg) when the PPE and acrylate components were both included.

TABLE 3

| Component | Unit | C. Ex. 1 | Ex. 1 | C. Ex. 2 | Ex 2 | C. Ex. 3 | Ex. 3 |
|---|---|---|---|---|---|---|---|
| PPE | g | | 6 | | 6 | | 6 |
| DPGDA | g | 20 | 14 | | | | |
| HDDA | g | | | 20 | 14 | | |
| TGPDA | g | | | | | 20 | 14 |
| Tg | ° C. | 129 | 160 | 102 | 194 | 67 | 120 |

*Each composition also included DMPA as photoinitiator in an amount of 1 part per hundred of resin (phr)

UV and thermal dual-cured compositions were also prepared, as shown in Table 4. The compositions shown in Table 4 were cast into films between glass slides, and cured under UV light for 10 minutes. A UVP Blak-Ray B-100A UV lamp operating at 100 watts at 365 nm wavelength was used. The UV-cured films were then heated at 120° C. in an oven for 1 hour. The UV/thermally dual cured films were placed in chloroform, wherein they were determined to be insoluble due to network formation. The films were further analyzed by differential scanning calorimetry (DSC), which show an increase in glass transition temperature (Tg) when the PPE and acrylate components were both included.

TABLE 4

| Component | Unit | C. Ex. 4 | C. Ex. 5 | Ex. 4 |
|---|---|---|---|---|
| PPE | g | | | 6 |
| PUA-2 | g | 20 | | |
| DPGDA | g | | 20 | 14 |
| Tg | ° C. | n.d. | 133 | 174 |

*Each composition also included DMPA as photoinitiator in an amount of 2 phr and BPO as a thermal initiator in an amount of 2 phr This disclosure further encompasses the following aspects.

Aspect 1: A curable composition comprising: a functionalized phenylene ether oligomer, preferably wherein the functionalized phenylene ether oligomer comprises at least one end group that is a (meth)acrylate group, a vinyl benzene group, an allyl group, or a maleimide group; a reactive diluent; and a photoinitiator.

Aspect 2: The curable composition of aspect 1, wherein the functionalized phenylene ether oligomer has the structure

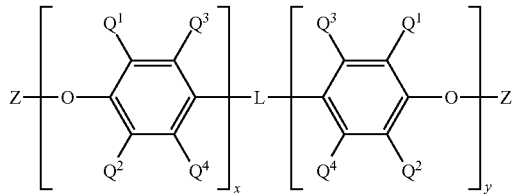

wherein $Q^1$ and $Q^2$ each independently comprise halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms; $Q^3$ and $Q^4$ each independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms; Z is independently at each occurrence a (meth)acrylate group, a vinyl benzene group, an allyl group, or a maleimide group, preferably a (meth)acrylate group, more preferably a methacrylate group; and L is of the structure

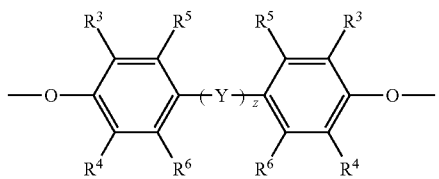

wherein $R^3$, $R^4$, $R^5$, and $R^6$ each independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms; z is 0 or 1; and Y has a structure

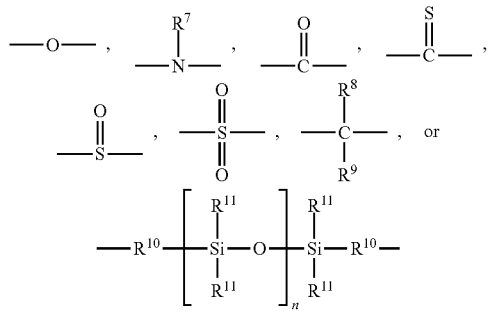

wherein $R^7$ is independently at each occurrence hydrogen and $C_{1-12}$ hydrocarbyl; $R^8$ and $R^9$ are independently at each occurrence hydrogen, $C_{1-12}$ hydrocarbyl, and $C_{1-6}$ hydrocarbylene wherein $R^8$ and $R^9$ collectively form a $C_{4-12}$ alkylene group; $R^{10}$ is independently at each occurrence a $C_{1-6}$ hydrocarbylene group; $R^{11}$ is independently at each occurrence a hydrogen, $C_{1-12}$ hydrocarbyl or $C_{1-12}$ halohydrocarbyl; and n is 5 to 50; and x and y are independently 0 to 30, provided that the sum of x and y is at least 2.

Aspect 3: The curable composition of aspect 2, wherein $Q^1$ and $Q^2$ each independently comprise unsubstituted or substituted $C_{1-12}$ primary or secondary hydrocarbyl, preferably methyl; $Q^3$ and $Q^4$ each independently comprise hydrogen; Z is a (meth)acrylate group, preferably a methacrylate group; and L is of the structure

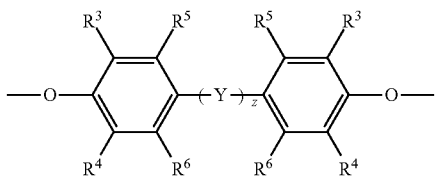

wherein $R^3$, $R^4$, $R^5$, and $R^6$ each independently comprise hydrogen or unsubstituted or substituted $C_{1-12}$ primary or secondary hydrocarbyl; and z is 1.

Aspect 4: The curable composition of aspect 2, wherein $Q^1$ and $Q^2$ each independently comprise unsubstituted or substituted $C_{1-12}$ primary or secondary hydrocarbyl, preferably methyl; $Q^3$ and $Q^4$ each independently comprise hydrogen; Z is a (meth)acrylate group, preferably a methacrylate group; and L is of the structure

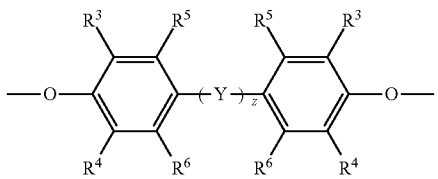

wherein $R^3$, $R^4$, $R^5$, and $R^6$ each independently comprise hydrogen or unsubstituted or substituted $C_{1-12}$ primary or secondary hydrocarbyl; and z is 0.

Aspect 5: The curable composition of any of aspects 2 to 3, wherein L is

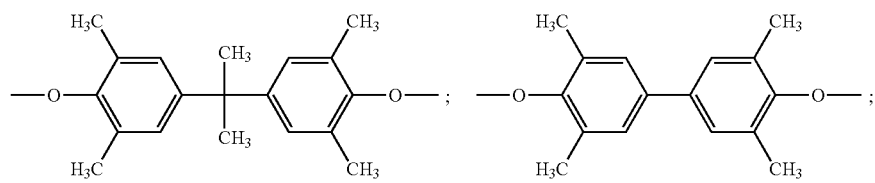

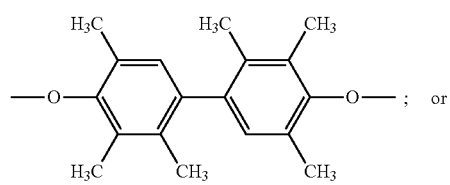

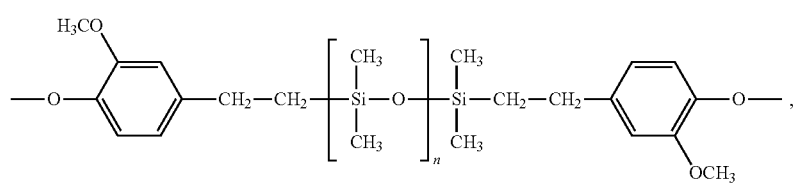

wherein n is 5 to 45.

Aspect 6: The curable composition of any of claims 1 to 5, wherein the reactive diluent comprises a (meth)acrylate monomer, a di(meth)acrylate), a vinyl monomer, or a combination thereof; preferably wherein the reactive diluent comprises dipropylene glycol diacrylate, hexanediol diacrylate, tripropylene glycol diacrylate, isobornyl acrylate, isobornyl methacrylate, 4-t-butylcyclohexyl acrylate, or a combination thereof.

Aspect 7: The curable composition of any of aspects 1 to 7, wherein the curable composition further comprises a photocurable resin, preferably a (meth)acrylate-containing oligomer.

Aspect 8: The curable composition of any of aspects 1 to 7, wherein the photoinitiator is a free radical photoinitiator.

Aspect 9: The curable composition of any of aspects 1 to 8, further comprising a thermal initiator, preferably a peroxide.

Aspect 10: The curable composition of any of aspects 1 to 9, further comprising: an auxiliary resin comprising an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof, preferably an epoxy resin or an oligomer or polymer with curable vinyl functionality; and a curing promoter comprising aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, or a combination thereof, preferably a tertiary amine, a Lewis acid, or a combination thereof.

Aspect 11: The curable composition of any of aspects 1 to 9, comprising 1 to 50 weight percent, or 10 to 40 weight percent, or 20 to 40 weight percent of the functionalized phenylene ether oligomer; and 50 to 99 weight percent, or 60 to 90 weight percent, or 60 to 80 weight percent of the reactive diluent; wherein weight percent of the phenylene ether oligomer and the reactive diluent are each based on the total weight of the phenylene ether oligomer and the reactive diluent; and 1 to 10 parts per hundred, or 1 to 5 parts per hundred of the photoinitiator, based on the total weight of the phenylene ether oligomer and the reactive diluent.

Aspect 12: The curable composition of aspect 7, comprising 5 to 30 weight percent, or 5 to 15 weight percent of the phenylene ether oligomer; 17 to 37 weight percent, or 22 to 32 weight percent of the reactive diluent; and 53 to 73 weight percent, or 58 to 68 weight percent of the photocurable resin, wherein weight percent of the phenylene ether oligomer, the reactive diluent and the photocurable resin are each based on the total weight of the phenylene ether oligomer, the reactive diluent and the photocurable resin; and 1 to 10 parts per hundred, or 1 to 5 parts per hundred of the photoinitiator, based on the total weight of the phenylene ether oligomer, the reactive diluent and the photocurable resin.

Aspect 13: A cured composition comprising a cured product of the curable composition of any of claims 1 to 12, optionally wherein the cured composition has a glass transition temperature of greater than or equal to 120° C., or greater than or equal to 150° C.

Aspect 14: A method for the manufacture of a cured composition, the method comprising curing the curable composition of any of claims 1 to 13 using ultraviolet light and, optionally, heat; optionally, wherein the method is an additive manufacturing method.

Aspect 15: An article comprising the cured composition of claim 13, preferably wherein the article is a three-dimensional, additively-manufactured article.

Aspect 16: A three-dimensional, additively-manufactured article comprising a cured product of a curable composition comprising a functionalized phenylene ether oligomer, optionally in an amount of 1 to 50 weight percent, or 10 to 40 weight percent, or 20 to 40 weight percent; a reactive diluent, optionally in an amount of 50 to 99 weight percent, or 60 to 90 weight percent, or 60 to 80 weight percent; and a radical photoinitiator, optionally in an amount of 1 to 10 parts per hundred, or 1 to 5 parts per hundred; wherein weight percent of each of the functionalized phenylene ether oligomer and the reactive diluent is based on the total weight of the phenylene ether oligomer and the reactive diluent; and parts per hundred of the photoinitiator is based on the total weight of the phenylene ether oligomer and the reactive diluent.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. The term "combination thereof" as used herein includes one or more of the listed elements, and is open, allowing the presence of one or more like elements not named. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl," whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC═CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(═O)$_2$-alkyl), a C$_{6-12}$ aryl sulfonyl (—S(═O)$_2$-aryl), a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A curable composition comprising:

20 to 40 weight percent of a functionalized phenylene ether oligomer having an intrinsic viscosity of 0.03 to 0.13 deciliter per gram, measured at 25° C. in chloroform using an Ubbelohde viscometer;

60 to 80 weight percent of a reactive diluent, wherein the reactive diluent is a (meth)acrylate-containing monomer; and a photoinitiator;

wherein weight percent is based on the total weight of the phenylene ether oligomer and the reactive diluent; and wherein the functionalized phenylene ether oligomer has the structure

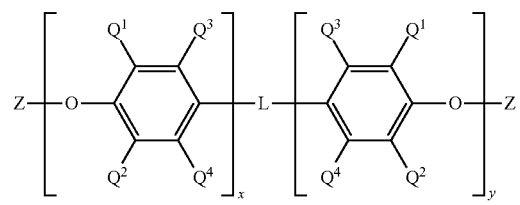

wherein

Q$^1$ and Q$^2$ each independently comprise halogen, unsubstituted or substituted C$_{1-12}$ primary or secondary hydrocarbyl, C$_{1-12}$ hydrocarbylthio, C$_{1-12}$ hydrocarbyloxy, and C$_{2-12}$ halohydrocarbyloxy wherein at least two carbon atoms separate the halogen and oxygen atoms;

Q$^3$ and Q$^4$ each independently comprise hydrogen, halogen, unsubstituted or substituted C$_{1-12}$ primary or secondary hydrocarbyl, C$_{1-12}$ hydrocarbylthio, C$_{1-12}$ hydrocarbyloxy, and C$_{2-12}$ halohydrocarbyloxy wherein at least two carbon atoms separate the halogen and oxygen atoms;

Z is independently at each occurrence a (meth)acrylate group, a vinyl benzene group, an allyl group, or a maleimide group; and L is of the structure

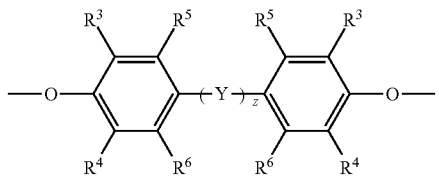

wherein

R$^3$, R$^4$, R$^5$, and R$^6$ each independently comprise hydrogen, halogen, unsubstituted or substituted C$_{1-12}$ primary or secondary hydrocarbyl, C$_{1-12}$ hydrocarbylthio, C$_{1-12}$ hydrocarbyloxy, and C$_{2-12}$ halohydrocarbyloxy wherein at least two carbon atoms separate the halogen and oxygen atoms;

z is 0 or 1; and
Y has a structure

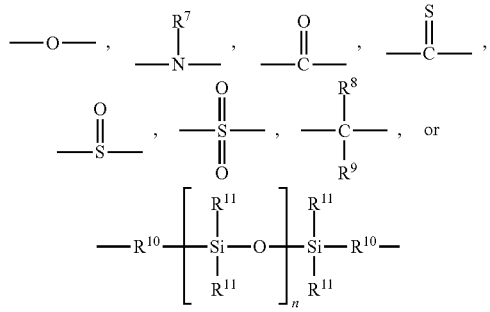

wherein
$R^7$ is independently at each occurrence hydrogen and $C_{1-12}$ hydrocarbyl;

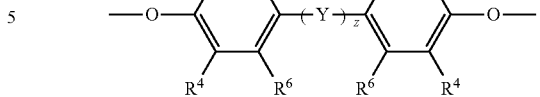

wherein
$R^3$, $R^4$, $R^5$, and $R^6$ each independently comprise hydrogen or unsubstituted or substituted $C_{1-12}$ primary or secondary hydrocarbyl; and
z is 1.

3. The curable composition of claim 1, wherein L is

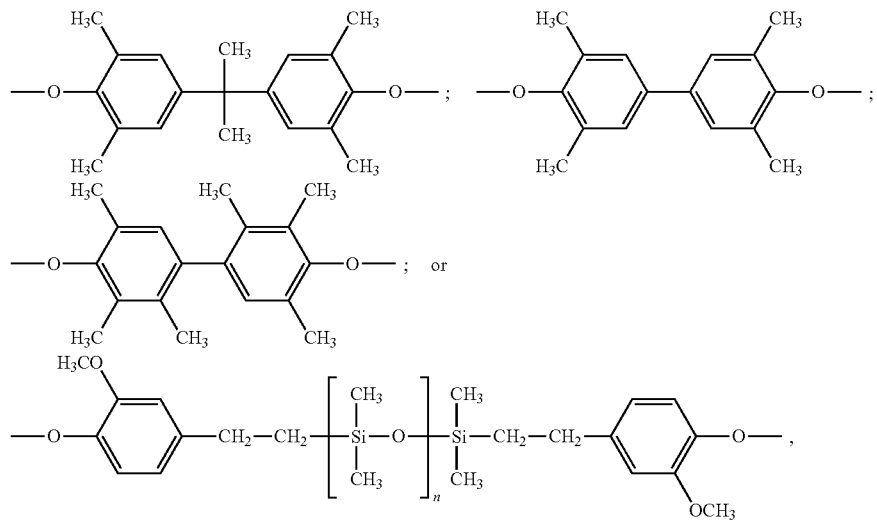

wherein n is 5 to 45.

4. The curable composition of claim 1, wherein the reactive diluent comprises
a $C_{1-24}$ alkyl (meth)acrylate monomer,
a di(meth)acrylate) comprising dipropylene glycol diacrylate, hexanediol diacrylate, tripropylene glycol diacrylate, isobornyl acrylate, isobornyl methacrylate, 4-t-butylcyclohexyl acrylate, or a combination thereof,
or a combination thereof.

5. A curable composition comprising:
5 to 30 weight percent of a functionalized phenylene ether oligomer having an intrinsic viscosity of 0.03 to 0.13 deciliter per gram, measured at 25° C. in chloroform using an Ubbelohde viscometer;
17 to 37 weight percent of a reactive diluent, wherein the reactive diluent is a (meth)acrylate-containing monomer;

$R^8$ and $R^9$ are independently at each occurrence hydrogen, $C_{1-12}$ hydrocarbyl, and $C_{1-6}$ hydrocarbylene wherein $R^8$ and $R^9$ collectively form a $C_{4-12}$ alkylene group;
$R^{10}$ is independently at each occurrence a $C_{1-6}$ hydrocarbylene group;
$R^{11}$ is independently at each occurrence a hydrogen, $C_{1-12}$ hydrocarbyl or $C_{1-12}$ halohydrocarbyl; and
n is 5 to 50; and
x and y are independently 0 to 30, provided that the sum of x and y is at least 2.

2. The curable composition of claim 1, wherein
$Q^1$ and $Q^2$ each independently comprise unsubstituted or substituted $C_{1-12}$ primary or secondary hydrocarbyl;
$Q^3$ and $Q^4$ each independently comprise hydrogen;
Z is a (meth)acrylate group; and
L is of the structure 57 to 73 weight percent of a photocurable resin; and
a photoinitiator;
wherein weight percent is based on the total weight of the phenylene ether oligomer, the reactive diluent and the photocurable resin; and
wherein the functionalized phenylene ether oligomer has the structure

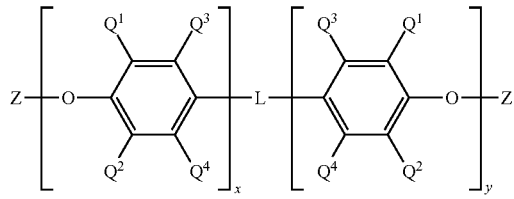

wherein
$Q^1$ and $Q^2$ each independently comprise halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
$Q^3$ and $Q^4$ each independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
Z is independently at each occurrence a (meth)acrylate group, a vinyl benzene group, an allyl group, or a maleimide group; and
L is of the structure

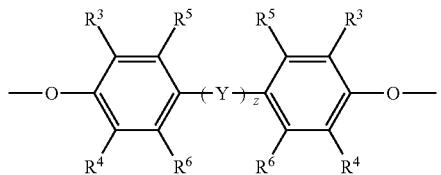

wherein
$R^3$, $R^4$, $R^5$, and $R^6$ each independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
z is 0 or 1; and
Y has a structure

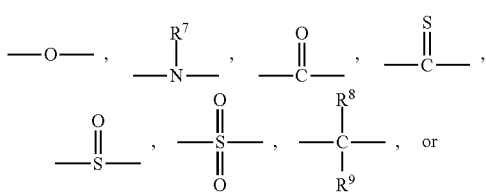

-continued

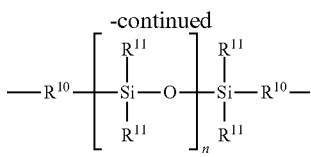

wherein
$R^7$ is independently at each occurrence hydrogen and $C_{1-12}$ hydrocarbyl;
$R^8$ and $R^9$ are independently at each occurrence hydrogen, $C_{1-12}$ hydrocarbyl, and $C_{1-6}$ hydrocarbylene wherein $R^8$ and $R^9$ collectively form a $C_{4-12}$ alkylene group;
$R^{10}$ is independently at each occurrence a $C_{1-6}$ hydrocarbylene group;
$R^{11}$ is independently at each occurrence a hydrogen, $C_{1-12}$ hydrocarbyl or $C_{1-12}$ halohydrocarbyl; and
n is 5 to 50; and
x and y are independently 0 to 30, provided that the sum of x and y is at least 2.

6. The curable composition of claim 1, wherein the photoinitiator is a free radical photoinitiator.

7. The curable composition of claim 1, further comprising a thermal initiator.

8. The curable composition of claim 1, further comprising:
an auxiliary resin comprising an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof; and
a curing promoter comprising aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, or a combination thereof.

9. The curable composition of claim 1, comprising 1 to 10 parts per hundred of the photoinitiator, based on the total weight of the phenylene ether oligomer and the reactive diluent.

10. The curable composition of claim 5, comprising 1 to 10 parts per hundred of the photoinitiator, based on the total weight of the phenylene ether oligomer, the reactive diluent and the photocurable resin.

11. A cured composition comprising a cured product of the curable composition of claim 1, optionally wherein the cured composition has a glass transition temperature of greater than or equal to 120° C.

12. A method for the manufacture of a cured composition, the method comprising curing the curable composition of claim 1 using ultraviolet light and, optionally, heat;
optionally, wherein the method is an additive manufacturing method.

13. An article comprising the cured composition of claim 11.

14. A three-dimensional, additively-manufactured article comprising a cured product of a curable composition comprising
20 to 40 weight percent of a functionalized phenylene ether oligomer having an intrinsic viscosity of 0.03 to 0.13 deciliter per gram, measured at 25° C. in chloroform using an Ubbelohde viscometer;
60 to 80 weight percent of a reactive diluent, wherein the reactive diluent is a (meth)acrylate-containing; and
a photoinitiator;
wherein weight percent of each of the functionalized phenylene ether oligomer and the reactive diluent is based on the total weight of the phenylene ether oligomer and the reactive diluent; wherein the functionalized phenylene ether oligomer has the structure

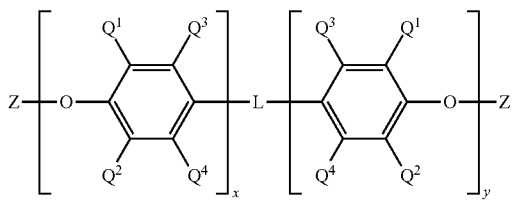

wherein
$Q^1$ and $Q^2$ each independently comprise halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
$Q^3$ and $Q^4$ each independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
Z is independention at each occurrence a (meth)acrylate group, a vinyl benzene group, an allyl group, or a maleimide group; and
L is of the structure

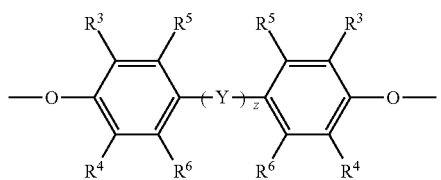

wherein
$R^3$, $R^4$, $R^5$, and $R^6$ each independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
z is 0 or 1; and
Y has a structure

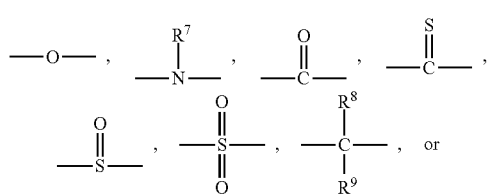

-continued

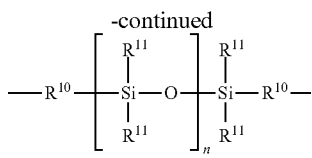

wherein
$R^7$ is independently at each occurrence hydrogen and $C_{1-12}$ hydrocarbyl;
$R^8$ and $R^9$ are independently at each occurrence hydrogen, $C_{1-12}$ hydrocarbyl, $C_{16}$ hydrocarbylene wherein $R^8$ and $R^9$ collectively form from a $C_{4-12}$ alkylene group;
$R^{10}$ is independently at each occurrence a $C_{1-6}$ hydrocarbylene group;
$R^{11}$ is independently at each occurrence a hydrogen, $C_{1-12}$ hydrocarbyl or $C_{1-12}$ halohydrocarbyl; and
n is 5 to 50; and
x and y are independently 0 to 30, provided that the sum of x and y is at least 2.

15. The curable composition of claim 5, wherein the photoinitiator is a free radical photoinitiator.

16. The curable composition of claim 5, further comprising a thermal initiator.

17. The curable composition of claim 5, further comprising:
an auxiliary resin comprising an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof; and
a curing promoter comprising aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, or a combination thereof.

18. The curable composition of claim 5, wherein
$Q^1$ and $Q^2$ each independently comprise unsubstituted or substituted $C_{1-12}$ primary or secondary hydrocarbyl;
$Q^3$ and $Q^4$ each independently comprise hydrogen;
Z is a (meth)acrylate group; and
L is of the structure

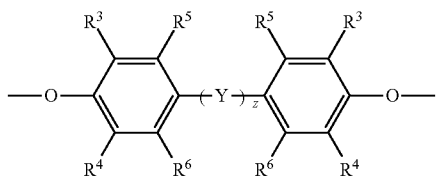

wherein
$R^3$, $R^4$, $R^5$, and $R^6$ each independently comprise hydrogen or unsubstituted or substituted $C_{1-12}$ primary or secondary hydrocarbyl; and
z is 1.

19. A cured composition comprising a cured product of the curable composition of claim 5, optionally wherein the cured composition has a glass transition temperature of greater than or equal to 120° C.

20. A three-dimensional, additively-manufactured article comprising a cured product of a curable composition comprising

- 5 to 30 weight percent of a functionalized phenylene ether oligomer having an intrinsic viscosity of 0.03 to 0.13 deciliter per gram, measured at 25° C. in chloroform using an Ubbelohde viscometer;
- 17 to 37 weight percent of a reactive diluent, wherein the reactive diluent is a (meth)acrylate-containing monomer;
- 53 to 73 weight percent a photocurable resin; and
- a photoinitiator;
- wherein weight percent of each of the functionalized phenylene ether oligomer and the reactive diluent is based on the total weight of the phenylene ether oligomer and the reactive diluent; wherein the functionalized phenylene ether oligomer has the structure

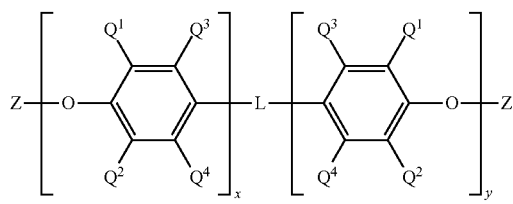

wherein

- $Q^1$ and $Q^2$ each independently comprise halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
- $Q^3$ and $Q^4$ each independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
- Z is independention at each occurrence a (meth)acrylate group, a vinyl benzene group, an allyl group, or a maleimide group; and
- L is of the structure

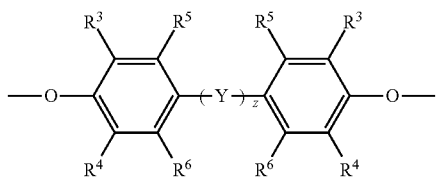

wherein

- $R^3$, $R^3$, $R^4$, $R^5$, and $R^6$ each independently comprise hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
- z is 0 or 1; and
- Y has a structure

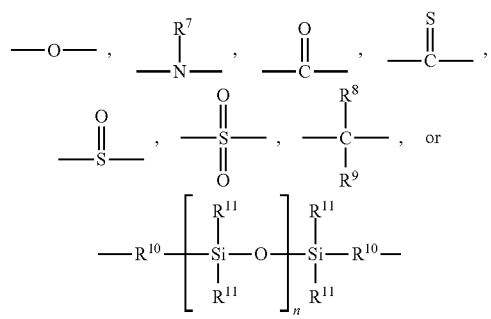

wherein

- $R^7$ is independently at each occurrence hydrogen and $C_{1-12}$ hydrocarbyl;
- $R^8$ and $R^9$ are independently at each occurrence hydrogen, $C_{1-12}$ hydrocarbyl, $C_{16}$ hydrocarbylene wherein $R^8$ and $R^9$ collectively form from a $C_{4-12}$ alkylene group;
- $R^{10}$ is independently at each occurrence a $C_{1-6}$ hydrocarbylene group;
- $R^{11}$ is independently at each occurrence a hydrogen, $C_{1-12}$ hydrocarbyl or $C_{1-12}$ halohydrocarbyl; and
- n is 5 to 50; and
- x and y are independently 0 to 30, provided that the sum of x and y is at least 2.

* * * * *